(12) United States Patent
Andrews et al.

(10) Patent No.: US 10,481,401 B2
(45) Date of Patent: Nov. 19, 2019

(54) SYSTEMS, DEVICES, AND METHODS FOR EYEBOX EXPANSION IN WEARABLE HEADS-UP DISPLAY

(71) Applicant: North Inc., Kitchener (CA)

(72) Inventors: Ian Andrews, Kitchener (CA); Joshua Moore, Elora (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/970,645

(22) Filed: May 3, 2018

(65) Prior Publication Data

US 2018/0321495 A1 Nov. 8, 2018

Related U.S. Application Data

(60) Provisional application No. 62/501,587, filed on May 4, 2017.

(51) Int. Cl.
*G02B 27/01* (2006.01)
*G03H 1/02* (2006.01)
*H04N 9/31* (2006.01)
*G02B 26/08* (2006.01)

(52) U.S. Cl.
CPC ..... *G02B 27/0172* (2013.01); *G02B 27/0179* (2013.01); *G03H 1/024* (2013.01); *H04N 9/317* (2013.01); *H04N 9/3135* (2013.01); *H04N 9/3161* (2013.01); *H04N 9/3164* (2013.01); *H04N 9/3173* (2013.01); *G02B 26/0833* (2013.01); *G02B 2027/0112* (2013.01); *G02B 2027/0174* (2013.01); *G02B 2027/0178* (2013.01); *H04N 9/3105* (2013.01)

(58) Field of Classification Search
None
See application file for complete search history.

(56) References Cited

U.S. PATENT DOCUMENTS

2007/0109619 A1* 5/2007 Eberl ............... A61B 3/113
359/17

* cited by examiner

*Primary Examiner* — Samira Monshi
(74) *Attorney, Agent, or Firm* — Thomas Mahon

(57) ABSTRACT

Systems, devices, and methods for eyebox expansion in wearable heads-up displays (WHUD) are described. A WHUD includes a support structure, a scanning laser projector (SLP), a split mirror, an optical splitter, and a holographic combiner. When the WHUD is worn on the head of a user the holographic combiner is positioned in a field of view of the user. The SLP scans light signals onto the split mirror which reflects the light signals onto the optical splitter. The optical splitter redirects the light signals towards the holographic combiner such that subsets of the light signals originate from spatially-separated virtual positions. The holographic combiner redirects the light to the eye resulting in spatially-separated exit pupils. The spatial separation of the exit pupils results in an expanded eyebox. The indirect path of light from SLP to optical splitter enables a smaller and therefore more aesthetically desirable design for the WHUD.

9 Claims, 4 Drawing Sheets

SYSTEMS, DEVICES, AND METHODS FOR EYEBOX EXPANSION IN WEARABLE HEADS-UP DISPLAY

TECHNICAL FIELD

The present systems, devices, and methods generally relate to wearable heads-up displays and particularly relate to eyebox expansion in wearable heads-up displays.

BACKGROUND

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a temporal pattern of laser light and usually at least one controllable mirror is used to spatially distribute the modulated temporal pattern of laser light over a two-dimensional area of another object. The spatial distribution of the modulated temporal pattern of laser light produces a series of images at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display may be summarized as including: a support structure that in use is worn on a head of a user; a holographic combiner carried by the support structure and positioned in a field of view of the user when the support structure is worn on the head of the user; a scanning laser projector carried by the support structure, the scanning laser projector to output light signals; an optical splitter carried by the support structure, the optical splitter comprising at least one optical element arranged to receive light signals generated by the scanning laser projector and redirect each light signal towards the holographic combiner effectively from one of N spatially-separated virtual positions for the scanning laser projector, where N is an integer greater than 1, the particular virtual position for the scanning laser projector from which a light signal is redirected by the optical splitter determined by a point of incidence at which the light signal is received by the optical splitter; and a split mirror carried by the support structure, the split mirror comprising at least two non-coplanar reflective surfaces to receive light signals from the scanning laser projector and redirect the light signals towards the optical splitter.

The support structure may have the shape and appearance of an eyeglass frame, and the wearable heads-up display may further include an eyeglass lens carried by the support structure, wherein the transparent combiner in carried by the eyeglass lens.

The holographic combiner may converge the light signals to at least two exit pupils at or proximate the eye of the user.

The scanning laser projector may include: a red laser diode to output red laser light, a green laser diode to output green laser light, a blue laser diode to output blue laser light, a beam combiner to combine the red laser light, green laser light, and blue laser light into an aggregate beam, and at least one controllable mirror to scan the aggregate beam across the split mirror.

The split mirror may be a single unitary element with at least two non-coplanar reflective surfaces. The split mirror may include a first element having at least one reflective surface and a second element having at least one reflective surface. Each reflective surface of the split mirror redirects light to a distinct and non-overlapping region of the optical splitter. Each reflective surface of the split mirror redirects a discrete set of light signals towards the optical splitter.

The optical splitter may have N non-coplanar input surfaces to receive light signals from the split mirror, where N is an integer greater than 1, and an output surface to direct light towards the holographic combiner, the output surface positioned across a thickness of the optical splitter from the input surfaces. Alternatively, the optical splitter may have an input surface to receive light signals from the split mirror, and N non-coplanar output surfaces to direct light towards the holographic combiner, where N is an integer greater than 1, the output surfaces positioned across a thickness of the optical splitter from the input surface.

The split mirror may be positioned to receive at least 90% of the light signals output by the scanning laser projector. The optical splitter may be positioned to receive at least 90% of the light signals reflected by the split mirror.

A method of operating a wearable heads-up display (WHUD) when the WHUD is worn on a head of a user, the WHUD including a scanning laser projector having a scan range, a split mirror having at least two non-coplanar reflective surfaces, an optical splitter, and a holographic combiner, may be summarized as including: generating light signals by the scanning laser projector; scanning the light signals towards the split mirror across the scan range by the scanning laser projector; directing the light signals towards the optical splitter by the split mirror; directing the light signals towards the holographic combiner by the optical splitter, wherein the optical path of a respective light signal from the optical splitter to the holographic combiner is determined by a respective point of incidence and angle of incidence of the respective light signal at the optical splitter; and directing the light signals towards an eye of the user by the holographic combiner.

Directing the light signals towards an eye of the user by the holographic combiner may further include directing the light signals to at least two exit pupils at or proximate the eye of the user.

The scanning laser projector may include a red laser diode, a green laser diode, a blue laser diode, a beam combiner, and at least one controllable mirror, and generating light signals by the scanning laser projector may further include: generating red laser light by the red laser diode; generating green laser light by the green laser diode; and generating blue laser light by the blue laser diode; wherein the method further includes: combining the red laser light, green laser light, and blue laser light into aggregate light signals; and wherein: scanning the light signals towards the split mirror across the scan range by the scanning laser projector further includes scanning the light signals towards the split mirror by the at least one controllable mirror.

Directing the light signals towards the optical splitter by the split mirror may further include: directing the light signals towards respective distinct and non-overlapping regions of the optical splitter by each respective non-coplanar reflective surface of the split mirror.

Directing the light signals towards the optical splitter by the split mirror may further includes: directing respective discrete sets of light signals towards the optical splitter by each respective non-coplanar reflective surface of the split mirror.

Scanning the light signals towards the split mirror across the scan range by the scanning laser projector may further include: scanning at least 90% of the light signals onto the split mirror by the scanning laser projector.

The method of operating the wearable heads-up display may further include receiving at least 90% of the reflected light signals from the split mirror by the optical splitter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
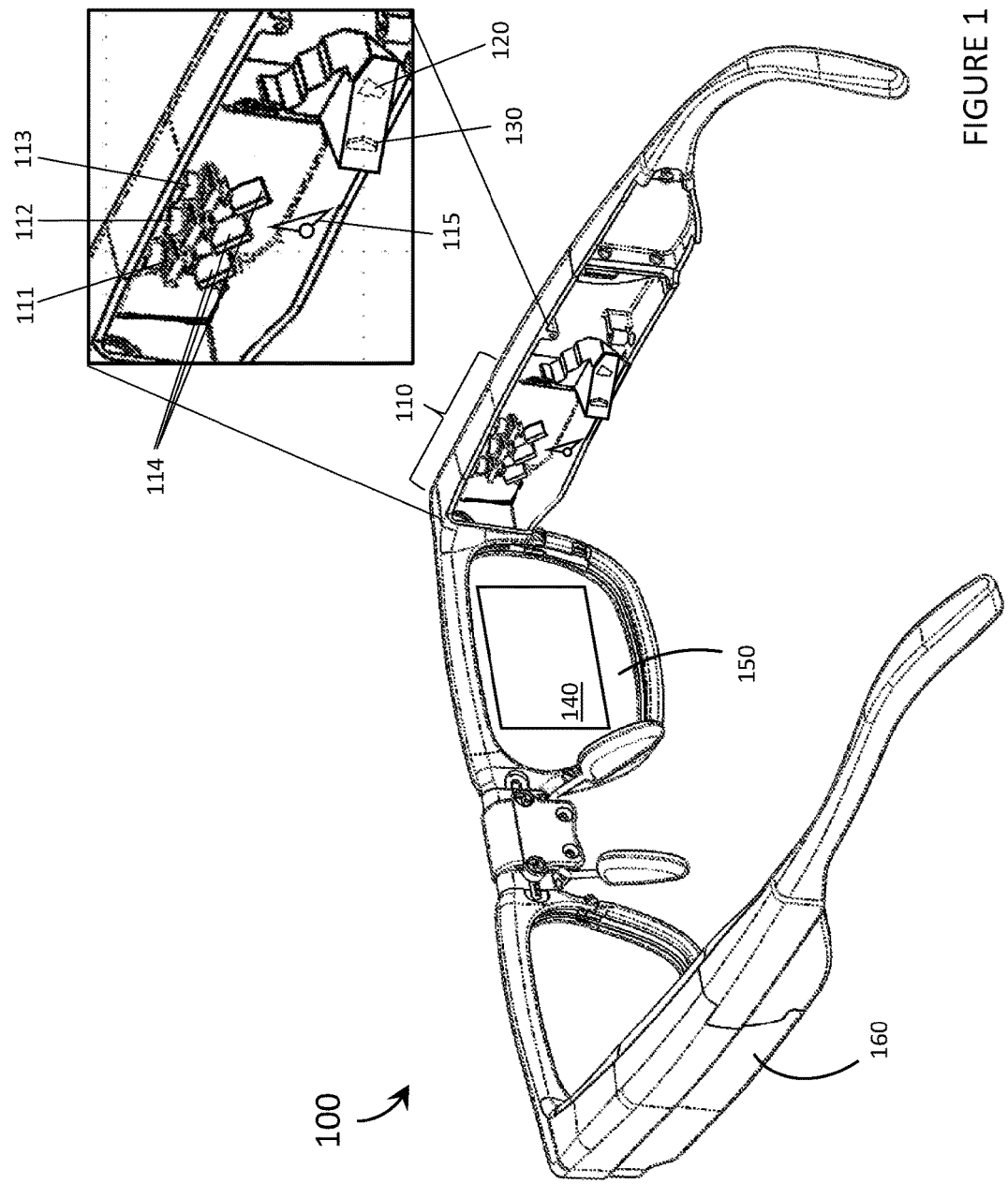
FIG. 1 is an isometric view of a wearable heads-up display in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for splitter optics that, among other potential applications, have particular utility in eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure, the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

Throughout this specification and the appended claims, the term "replication" and its variants are used (e.g., in the context of "exit pupil replication") to generally refer to situations where multiple instances of substantially the same exit pupil and/or display content are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. Unless the specific context requires otherwise, references to "exit pupil replication" herein include exit pupil replication by exit pupil repetition.

Throughout this specification and the appended claims, the term "holographic combiner" is used to generally refer to a holographic optical element which allows environmental light to pass through to an eye of a user and redirects display light from a light source to the eye of the user such that the environmental light and display light are "combined" and are both visible to the user. The holographic combiner may comprise at least one hologram, volume diffraction grating, surface relief diffraction grating, and/or reflection grating.

FIG. 1 is an isometric view of a wearable heads-up display (WHUD) 100 in accordance with the present systems, devices, and methods. WHUD 100 includes a support structure 160 that is worn on the head of a user, at least one eyeglass lens 150, a scanning laser projector 110, a split mirror 120, an optical splitter 130, and a holographic combiner 140 carried by eyeglass lens 150. Holographic combiner 140 is positioned in a field of view of an eye of the user when the support structure is worn on the head of the user. Scanning laser projector 110 includes a red laser diode 111, a green laser diode 112, a blue laser diode 113, a beam combiner 114, and a controllable mirror 115. Split mirror 120 has two reflective surfaces that are non-coplanar. In alternative implementations, split mirror 120 could have more than two reflective surfaces. Optical splitter 130 has two non-coplanar input surfaces and one output surface, the output surface is positioned across a thickness of the optical splitter from the input surfaces. In alternative implementations, optical splitter 130 could have more than two non-coplanar input surfaces and one output surface or could have one input surfaces and multiple non-coplanar output surfaces. WHUD 100 operates as follows.

Red laser diode 111 generates red laser light, green laser diode 112 generates green laser light, and blue laser diode 113 generates blue laser light. Beam combiner 114 is comprised of reflective mirrors, beam splitters, and/or dichroic mirrors and combines the red laser light, green laser light, and blue laser light into an aggregate beam. A person of skill in the art will appreciate that the aggregate beam may comprise light from only one of the laser diodes, any two of the laser diodes, or all three of the laser diodes in order to create a full color image. The aggregate beam is scanned towards split mirror 120 by controllable mirror 115. Controllable mirror 115 may be a single mirror that is rotatable or deformable in two dimensions or may be two mirrors that are each rotatable or deformable in a single dimension (e.g., orthogonal dimensions such as horizontal and vertical). Controllable mirror 115 may raster scan an image onto the two reflective surfaces of split mirror 120. Split mirror 120 reflects light signals created by the scanning of the aggregate beam towards optical splitter 130. In FIG. 1, optical splitter 130 has a first input surface and a second input surface and a single output surface. Each of the two reflective surfaces of split mirror 120 reflects a set of light signals towards a respective input surface of optical splitter 130. That is, a first distinct set of light signals is incident on the first input surface and a second distinct set of light signals is incident on the second input surface. Optical splitter 130 redirects the light signals towards holographic combiner 140. The path of a respective light signal from optical splitter 130 to holographic combiner 140 is dependent on the point of incidence of the respective light signal on optical splitter 130. The input surfaces of optical splitter 130 are oriented and positioned to alter the path of the respective light signals incident thereon such that the two sets of light signals appear to be originating from spatially-separated virtual positions. The virtual positions are separated by more than the actual physical positions of the points of incidence of the light signals on the input surfaces. Holographic combiner 140 redirects the light signals to the eye of the user. Each of the two sets of light signals represents a spatially-separated exit pupil at the eye of the user. These exit pupils may show the same image resulting in exit pupil replication at the eye of the user. WHUD 100 may have N number of spatially-separated exit pupils, wherein N is any integer greater than 1. That is, optical splitter 130 may redirect lights signals from N spatially-separated virtual positions. Optical splitter 130 may have N input surfaces to redirect the light signals.

Optical splitter 130 and WHUD 100 may be similar to the optical splitter and the wearable heads-up display previously described in U.S. Non-Provisional patent application Ser. No. 15/147,638 (hereafter "Ser. No. 15/147,638") and US Patent Application Publication No. 2016-0377866 A1/U.S. Non-Provisional patent application Ser. No. 15/046,254 (hereafter "2016-0377866"). The wearable heads-up display of both Ser. No. 15/147,638 and 2016-0377866 has a housing for the optical splitter (Ser. No. 15/147,638 and 2016-0377866, both FIG. 1, element 150) that juts out from the surrounding support structure in order to create an optimal distance between the scanning laser projector, specifically the scan mirror, and the optical splitter. This architecture is functional but for a more fashionable wearable heads-up display a smaller housing is desirable. The optical splitter and controllable mirror of Ser. No. 15/147,638 and 2016-0377866 could be brought closer together to decrease the size of the housing if the scan range of the controllable mirror was increased, but this would decrease the quality of the image created. With the addition of split mirror 120, the housing that holds optical splitter 130 can be decreased in size because the position of controllable mirror 115 (equivalent to the scan mirror) is held by split mirror 120. Split mirror 120 does not have a scan range and therefore can be positioned closer to optical splitter 130 than the scan mirror of Ser. No. 15/147,638 and 2016-0377866 without decreasing image quality. The configuration of WHUD 100 may allow for all of the light scanned from controllable mirror 115 to be spread across both of split mirror 120 and optical mirror 130 resulting in minimal losses in image quality (e.g., image resolution).

Figure 2:
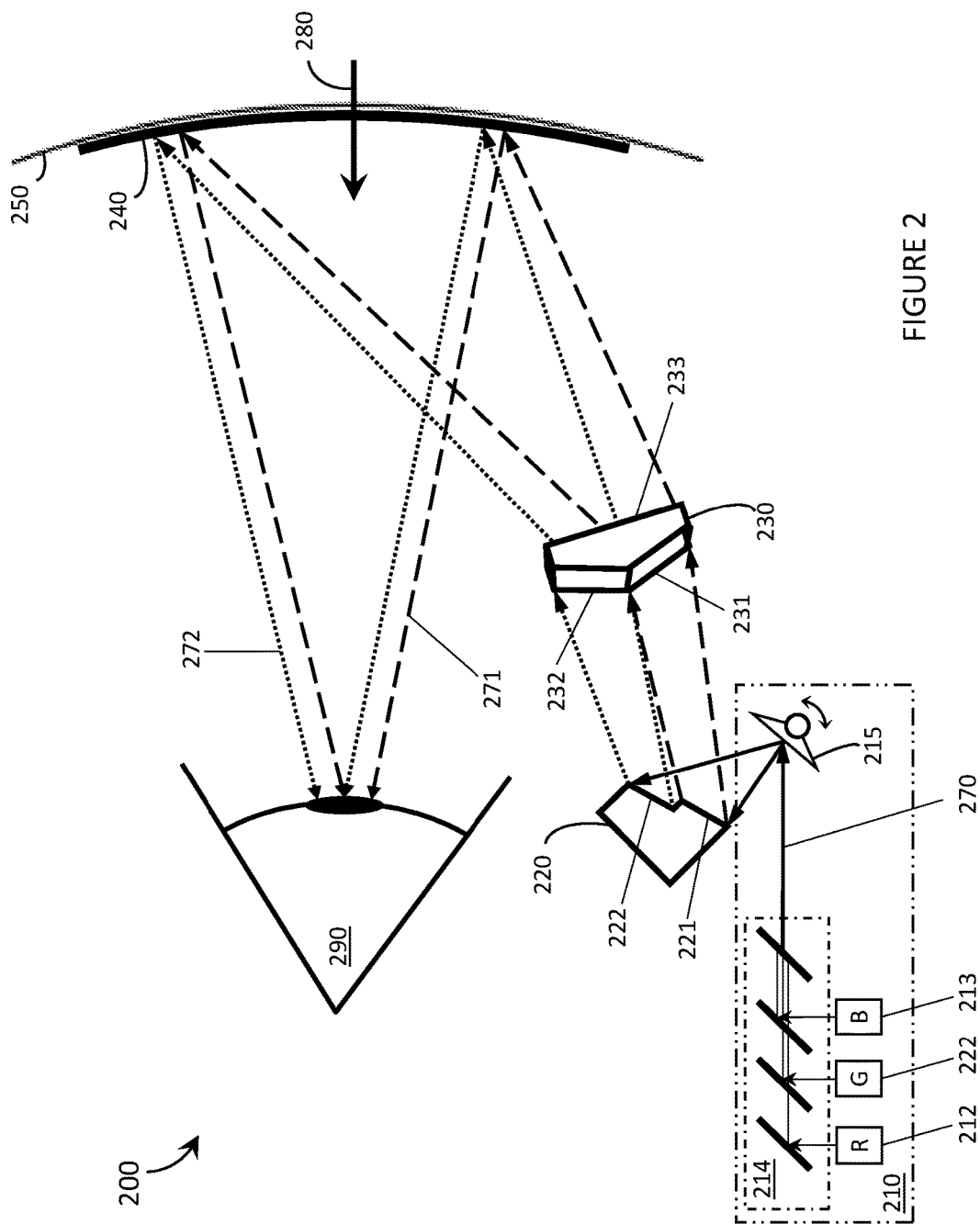
FIG. 2 is a schematic diagram of a wearable heads-up display in accordance with the present systems, devices, and methods.

FIG. 2 is a schematic diagram of a wearable heads-up display 200 in accordance with the present systems, devices, and methods. WHUD 200 may be similar to WHUD 100 of FIG. 1 and includes a scanning laser projector 210, a split mirror 220, an optical splitter 230, and a holographic combiner 240 carried on an eyeglass lens 250. Scanning laser projector 210 includes a red laser diode 211, a green laser diode 212, a blue laser diode 213, a beam combiner 214, and a controllable mirror 215. A support structure of WHUD 200 (not shown) is worn on the head of a user and may have the shape and appearance of eyeglasses. WHUD 200 operates as follows.

Red laser diode 211 generates red laser light, green laser diode 212 generates green laser light, and blue laser diode 213 generates blue laser light. Beam combiner 214 combines the red laser light, green laser light, and blue laser light into an aggregate beam 270 (solid line arrows; only one arrow labelled to reduce clutter) and directs aggregate beam 270 towards controllable mirror 215. Beam combiner 214 comprises reflective mirrors, beam splitters, and/or dichroic mirrors. Controllable mirror 215 scans aggregate beam 270 onto split mirror 220 (two solid arrows used to show scan range of aggregate beam from controllable mirror 215 to split mirror 220). Controllable mirror 215 may be a single mirror (e.g., a microelectromechanical system ("MEMS") based digital micromirror) that is controllably rotatable or deformable in two dimensions, or two mirrors that are each controllably rotatable or deformable about a respective dimension. Split mirror 220 has two reflective surfaces, 221 and 222, which both receive scanned aggregate beam 220 from controllable mirror 215. Split mirror 220 may be a single unitary element having two reflective surfaces (as shown), or may be two separate elements: a first element having a first reflective surface and a second element having a second reflective surface. The reflective surfaces of split mirror 220 are positioned to receive at least 90% and preferably 100% of the light scanned from controllable mirror 215 while maximizing the area of the reflective surfaces upon which light in incident. That is, preferably split mirror 220 is sized and positioned such that the dimensions of the reflective surface of split mirror 220 are the same as the dimensions of the scan area of controllable mirror 215 when aggregate beam 270 is incident on split mirror 220. Split mirror 220 reflects aggregate beam 270 towards optical splitter 230. Optical splitter 230 has two input surfaces 231 and 232, which are not coplanar, and one output surface 233. Output surface 233 is positioned across a thickness of optical splitter from the input surfaces. In another embodiment, optical splitter 230 may have more than two non-coplanar input surfaces and each of reflective surface 221 and reflective surface 222 may direct light to more than one input surface. For example, optical splitter 230 may have four input surfaces and reflective surface 221 may direct light to first and second input surfaces while reflective surface 222 may direct light to third and fourth input surfaces. Aggregate beam 270 is reflected from split mirror 220 as two sets of light signals 271 and 272. Light signals 271 (dashed line arrows; sets of two arrows represent the outer boundaries of the light signals; only one arrow labelled to reduce clutter) are reflected from reflective surface 221 to input surface 231. Light signals 272 (dotted line arrows; set of two arrows represent outer boundaries of the light signals; only one arrow labelled to reduce clutter) are reflected from reflective surface 222 to input surface 232. Optical splitter 230 is positioned to receive at least 90% and preferably 100% of light reflected by split mirror 220 while maximizing the area of the input surfaces upon which light is incident. Optical splitter 230 directs light signals 271 and light signals 272 towards holographic combiner 240. Light signals 271 and light signals 272 are redirected towards holographic combiner 240 by optical splitter 230 from two spatially-separated virtual positions. That is, the path of a respective light signal (from light signals 271 or light signals 272) from optical splitter 230 to holographic combiner 240 is determined by the point of incidence and the angle of incidence of the light signal on optical splitter 230. The point of incidence and angle of incidence of a respective light signal on optical splitter 230 is determined by the reflection of the respective light signal from split mirror 220. Light signals 271 and light signals 272 are redirected by the holographic combiner towards an eye 280 of a user. Because light signals 271 and light signals 272 are directed from two spatially-separated virtual positions they are also incident at eye 280 at two spatially-separated exit pupils. In this way the eyebox of the wearable heads-up display is increased in size. Each of light signals 271 and light signals 272 represent the same image, resulting in exit pupil replication at the eye of the user. Environmental light 290 in the field of view of eye 280 passes through eyeglass lens 260 and holographic combiner 240, allowing the user to see both the display and their environment. In other embodiments, WHUD 200 may include an eye tracking system wherein scanning laser projector 210 includes an infrared laser diode and infrared laser light is scanned onto eye 280 and infrared light reflected from eye 280 is captured and analyzed to determine a position of any number of features (e.g. pupil, cornea, etc.) of eye 280.

Figure 3:
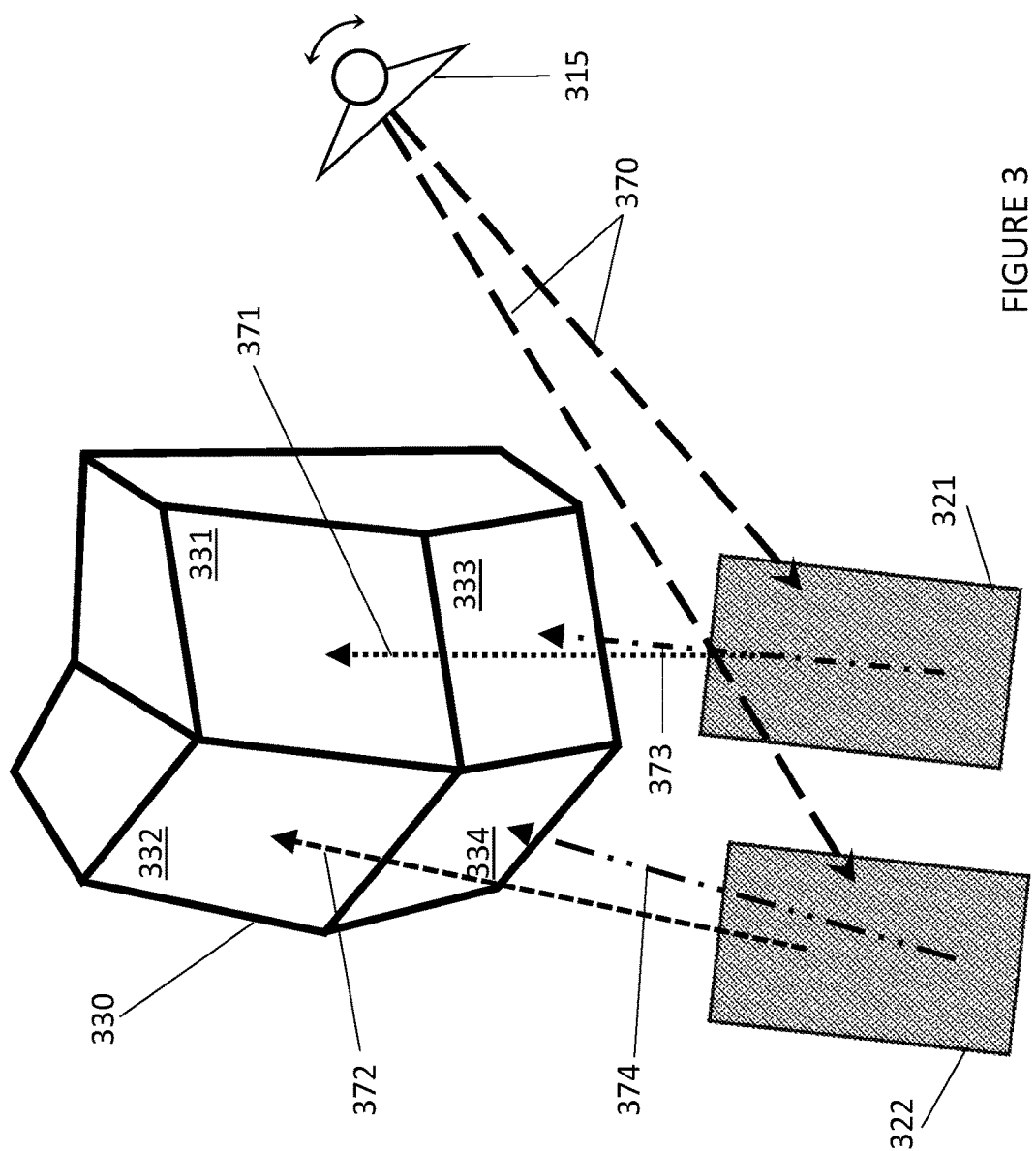
FIG. 3 is a schematic diagram of an optical splitter and two reflective surfaces of a split mirror of a wearable heads-up display in accordance with the present systems, device and methods.

FIG. 3 is a schematic diagram of an optical splitter 330 and two reflective surfaces, 321 and 322, of a split mirror (not fully shown) of a wearable heads-up display in accordance with the present systems, device and methods. The wearable heads-up display may be similar to WHUD 100 and WHUD 200 and includes a support structure (not shown), a scanning laser projector (not fully shown), the split mirror (not fully shown), optical splitter 330, and a holographic combiner carried on an eyeglass lens (not shown). The scanning laser projector may include laser diodes to generate laser light, a beam combiner to combine laser light into an aggregate beam (if there are multiple laser diodes), and a controllable mirror 315. The split mirror is similar to split mirror 120 of FIG. 1 and split mirror 220 of FIG. 2 and includes reflective surface 321 and reflective surface 322. Optical splitter 330 is similar to optical splitter 130 of FIG. 1 and optical splitter 230 of FIG. 2, and has a single output surface, but has four input surfaces 331, 332, 333, and 334, instead of two Input surfaces 331, 332, 333, and 334 are non-coplanar and are positioned across a thickness of optical splitter 330 from the output surface. In operation of the wearable heads-up display, aggregate beam 370 generated by the laser diodes and incident on controllable mirror 315 is scanned onto reflective surface 321 and reflective surface 322. Reflective surface 321 and reflective surface 322 are not co-planar. Reflective surface 321 and reflective surface 322 reflect discrete subsets of light signals produced by the scanning of aggregate beam 370 (arrows 370 represents all of the light scanned from controllable mirror 315 and incident on reflective surfaces 321 and 322) towards optical splitter 330. Reflective surface 321 reflects light signals 371 (single arrow 371 represents all of the light incident on and reflected by the top half of reflective surface 321) towards input surface 331 and reflects light signals 373 (single arrow 373 represents all of the light incident on and reflected by the bottom half of reflective surface 321) towards input surface 333. Reflective surface 322 reflects light signals 372 (single arrow 372 represents all of the light incident on and reflected by the top half of reflective surface 322) towards input surface 332 and reflects light signals 374 (single arrow 374 represents all of the light incident on and reflected by the bottom half of reflective surface 322) towards input surface 334. Light signals 371, 372, 373, and 374 exit the output surface of optical splitter 330 and are directed towards the holographic combiner, and subsequently towards an eye of the user. The path of a respective light signal from optical splitter 330 to the holographic combiner is determined by the points of incidence and angles of incidence of the respective light signal at optical splitter 330. The path from optical splitter 330 to the holographic combiner of light signals 371 is determined by the points of incidence and angles of incidence of the light signals on input surface 331. The path from optical splitter 330 to the holographic combiner of light signals 372 is determined by the points of incidence and angles of incidence of the light signals on input surface 332. The path from optical splitter 330 to the holographic combiner of light signals 373 is determined by the points of incidence and angles of incidence of the light signals on input surface 333. The path from optical splitter 330 to the holographic combiner of light signals 374 is determined by the points of incidence and angles of incidence of the light signals on input surface 334. Each of light signals 371, light signals 372, light signals 373, and light signals 374 exit the output surface on a path towards the holographic combiner that represents a spatially-separated virtual position. That is, light signals 371, light signals 372, light signals 373, and light signals 374 appear to have originated from respectively different locations, these locations being further apart than if the light was directed to the holographic combiner directly from the split mirror. The holographic combiner redirects each set of light signals such that light signals 371, light signals 372, light signals 373, and light signals 374 each represent a spatially-separated exit pupil at the eye of the user. The spatial separation of the four exit pupils creates a larger eyebox than could be achieved if the exit pupils were not separated by optical splitter 330. Each of light signals 371, lights signals 372, light signals 373, and light signals 374 represent a copy of the same image, wherein the aggregate beam scans four "identical" tiled images onto the split mirror, two images onto reflective surface 321 and two images onto reflective surface 322, resulting in exit pupil replication at the eye of the user. The position and orientation of controllable mirror 315, reflective surface 321, and reflective surface 322 are such that reflective surface 321 and reflective surface 322 receive at least 90% and preferably 100% of aggregate beam 370 scanned from controllable mirror while aggregate beam 370 is scanned onto at least 90% and preferably 100% of the areas of reflective surface 321 and reflective surface 322. The position and orientation of reflective surface 321, reflective surface 322, and optical splitter 330 are such that the input surfaces 331, 332, 333, and 334 of optical splitter 330 receive at least 90% and preferably 100% of the light reflected from reflective surface 321 and reflective surface 322 while light signals 371, light signals 372, light signals 373, and light signals 374 are incident on at least 90% and preferably 100% of input surface 331, input surface 332, input surface 333, and input surface 334, respectively.

Figure 4:
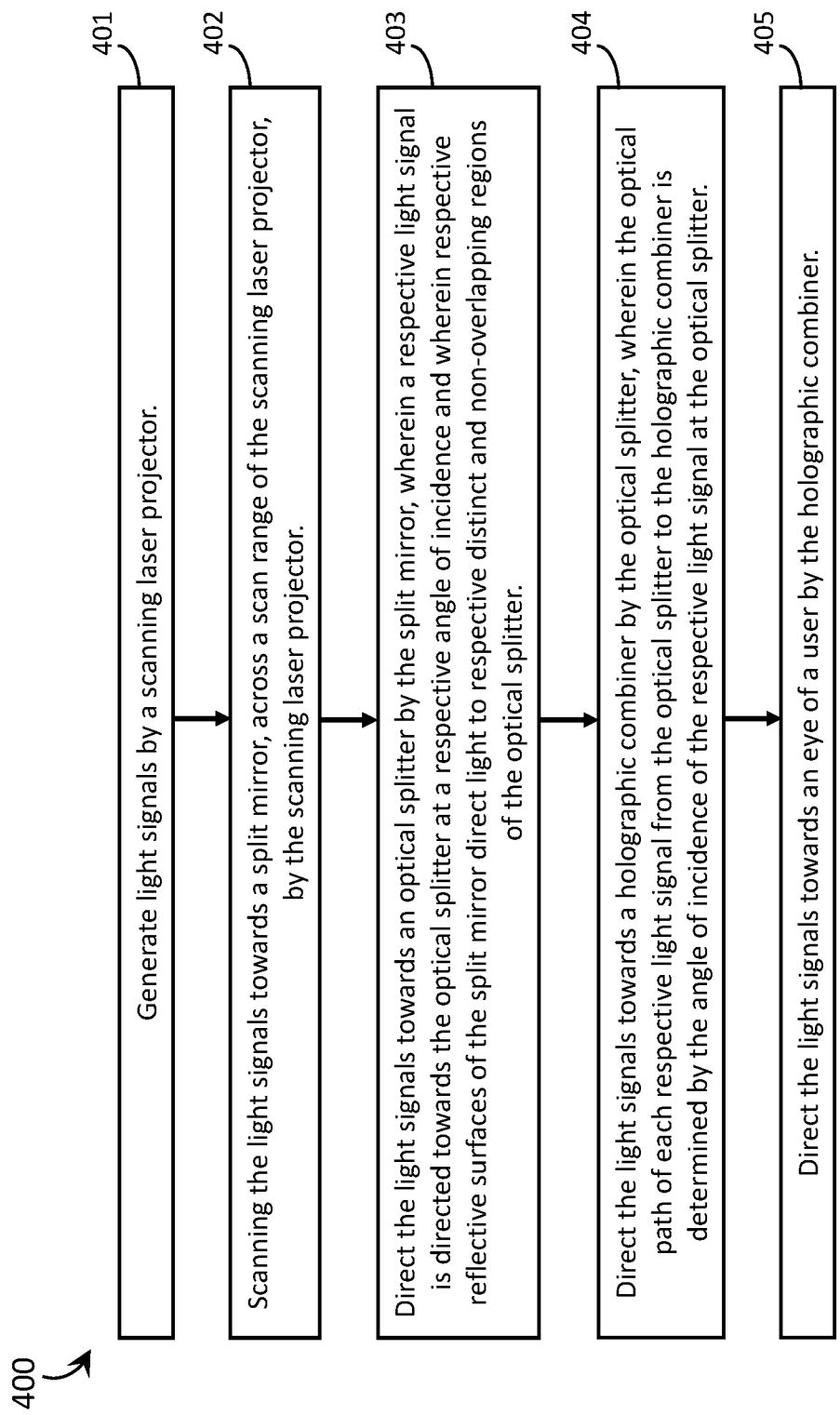
FIG. 4 is a flow diagram of a method of operating a wearable heads-up display with a scanning laser projector in accordance with present systems, devices, and methods.

FIG. 4 is a flow diagram of a method of operating a wearable heads-up display with a scanning laser projector in accordance with present systems, devices, and methods. The wearable heads-up display of FIG. 4 may be similar to WHUD 100 of FIG. 1, WHUD 200 of FIG. 2, and the WHUD described in FIG. 3, and includes a scanning laser projector, a split mirror having at least two non-coplanar reflective surfaces, an optical splitter, and a holographic combiner. The WHUD of FIG. 4 may comprise a support structure having the shape and appearance of eyeglasses. The WHUD positions a display in the field of view of an eye of a user when worn on a head of the user. Method 400 includes acts 401, 402, 403, 404, and 405, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 401, the scanning laser projector generates light signals. These light signals may be generated by at least one laser diode, wherein a beam combiner combines multiple beams into an aggregate beam if multiple laser diodes are employed. The at least one laser diode may include a red laser diode to generate red laser light, a green laser diode to generate green laser light, and a blue laser diode to generate blue laser light. The WHUD may include a processor and a non-transitory processor-readable storage medium wherein the processor executes data and/or instructions from the non-transitory processor-readable storage medium to generate the light signals.

At 402, the light signals are scanned across a scan range of the scanning laser projector towards the split mirror. The light signals may be scanned by at least one controllable mirror. The at least one controllable scan mirror may be one mirror that is controllably deformable or rotatable to scan in two dimensions or two scan mirrors that are each controllably deformable or rotatable in respective dimensions, the respective dimensions different from one another. At least 90%, and preferably 100%, of the light signals scanned by the scanning laser projector may be incident on the split mirror.

At 403, the split mirror directs the light signals towards the optical splitter, wherein each respective light signal is directed towards the optical splitter at a respective angle of incidence. The split mirror has at least two reflective surfaces, and each reflective surface may reflect a discrete subset of the light signals towards the optical splitter. Each reflective surface may reflect light signals towards a distinct and non-overlapping region of the optical splitter. These distinct, non-overlapping regions of the optical splitter may be at least two non-coplanar input surfaces. The split mirror may comprise a single element having two reflective surfaces that are not co-planar, or may comprise two elements each with one reflective surface, wherein the two reflective surfaces are not co-planar. At least 90%, and preferably 100%, of the light signals reflected by the split mirror may be incident on the optical splitter.

At 404, the optical splitter directs the light signals towards the holographic combiner, wherein the path of a respective light signal is determined by the point of incidence and the angle of incidence of the respective light signal on the optical splitter. The optical splitter directs the light signals towards the holographic combiner from N spatially-separated virtual positions, where N is an integer greater than 1. The optical splitter may have N input surfaces upon which the light signals are incident. These input surfaces may be angled with respect to the split mirror and not co-planar with each other or may apply different optical functions to the light signals incident thereon such that respective subsets of the light signals incident on respective input surfaces of the optical splitter are directed towards the holographic combiner from different virtual positions (the virtual positions being different than the position the light originated from at the split mirror). The optical splitter may have a single input surface and the optical functions applied to the respective subsets of light signals by the optical splitter may be applied within the optical splitter or at multiple non-coplanar output surfaces and may depend on the point of incidence and angle of incidence of a respective light signal on the single input surface of the optical splitter.

At 405, the holographic combiner directs the light signals towards an eye of a user. The respective subsets of light signals which were directed towards the holographic combiner from different virtual positions by the optical splitter are incident at the eye of the user as respective exit pupils. Each respective subset of light signals represents the same image, resulting in exit pupil replication at the eye of the user and a large eyebox.

A person of skill in the art will appreciate that the various embodiments for expanding eyeboxes described herein may be applied in non-WHUD applications. For example, the present systems, devices, and methods may be applied in non-wearable heads-up displays and/or in other applications that may or may not include a visible display.

A person of skill in the art will appreciate that the various embodiments for expanding eyeboxes described herein may be applied in wearable heads-up displays which do not include holographic combiners. That is, any non-holographic transparent combiner which allows environmental light to pass through to an eye of a user while also redirecting display light to the eye of the user may be used. An optical element which does not combine environmental light with display light at the eye of the user but instead blocks environmental light from the eye of the user may also be used.

A person of skill in the art will appreciate that the various embodiments for expanding eyeboxes described herein may be applied in non-scanning laser projector wearable heads-up displays. That is, a non-laser light source for generating light signals may be employed, including but not limited to: a light-emitting diode (LED), an organic light-emitting diode (OLED), a microLED, a microdisplay comprising LEDs, OLEDs, or microLEDs, and/or any other type of microdisplay. The wearable heads-up display may also not employ scanning of light signals to create a display, instead light signals may be projected directly onto a split mirror without scanning, particularly in implementations which employ a microdisplay.

A person of skill in the art will appreciate that the various embodiments for expanding eyeboxes described herein may be applied to wearable heads-up displays which employ alternative optical splitters to the optical splitter described above. In other implementations, an optical splitter may be any single optical element or group of optical elements which cause light signals to diverge from an initial path such that the light signals arrive at an eye of a user from one of N spatially-separated virtual positions, including but not limited to: waveguides, lightguides, optical fibers, dichroic mirrors, and/or prisms.

In some implementations, one or more optical fiber(s), waveguides, or lightguides may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

In this specification, the term "processor" is used. Generally, "processor" refers to hardware circuitry, in particular any of microprocessors, microcontrollers, application specific integrated circuits (ASICs), digital signal processors (DSPs), programmable gate arrays (PGAs), and/or programmable logic controllers (PLCs), or any other integrated or non-integrated circuit that perform logic operations.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. 2016-0377866 A1 US, US Patent Application Publication No. 2016-0377865, US Patent Application Publication No. US 2014-0198034 A1, US Patent Application Publication No. US 2016-0238845 A1, US Patent Application Publication No. US 2014-0198035 A1, Non-Provisional patent application Ser. Nos. 15/046,234, 15/046,254, 15/145,576, 15/145,609, 15/147,638, 15/145,583, 15/256,148, 15/167,458, 15/167,472, 15/167,484, 15/381,883, 15/331,204, 15/282,535, U.S. Provisional Patent Application Ser. No. 62/271,135 U.S. Provisional Patent Application Ser. No. 62/268,892, U.S. Provisional Patent Application Ser. No. 62/322,128, U.S. Provisional Patent Application Ser. No. 62/420,368, U.S. Provisional Patent Application Ser. No. 62/420,371, U.S. Provisional Patent Application Ser. No. 62/420,380, U.S. Provisional Patent Application Ser. No. 62/438,725, U.S. Provisional Patent Application Ser. No. 62/374,181, U.S. Provisional Patent Application Ser. No. 62/482,062, U.S. Provisional Patent Application Ser. No. 62/557,551, U.S. Provisional Patent Application Ser. No. 62/557,554, U.S. Provisional Patent Application Ser. No. 62/565,677, U.S. Provisional Patent Application Ser. No. 62/573,978, and U.S. Provisional Patent Application Ser. No. 62/501,587 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wearable heads-up display (WHUD) when the WHUD is worn on a head of a user, the WHUD including a scanning laser projector having a scan range, a split mirror having at least two non-coplanar reflective surfaces, an optical splitter, and a holographic combiner, the method comprising:
  generating light signals by the scanning laser projector;
  scanning the light signals towards the split mirror across the scan range by the scanning laser projector;
  directing the light signals towards the optical splitter by the split mirror;
  directing the light signals towards the holographic combiner by the optical splitter, wherein the optical path of a respective light signal from the optical splitter to the holographic combiner is determined by a respective point of incidence and angle of incidence of the respective light signal at the optical splitter; and directing the light signals to at least two exit pupils at or proximate an eye of the user by the holographic combiner.

2. The method claim 1 wherein the scanning laser projector includes a red laser diode, a green laser diode, a blue laser diode, a beam combiner, and at least one controllable mirror, and wherein generating light signals by the scanning laser projector further includes:
   generating red laser light by the red laser diode;
   generating green laser light by the green laser diode; and
   generating blue laser light by the blue laser diode;
   wherein the method further includes:
   combining the red laser light, green laser light, and blue laser light into aggregate light signals; and wherein:
   scanning the light signals towards the split mirror across the scan range by the scanning laser projector further includes scanning the light signals towards the split mirror by the at least one controllable mirror.

3. The method of claim 1 wherein directing the light signals towards the optical splitter by the split mirror further includes:
   directing the light signals towards respective distinct and non-overlapping regions of the optical splitter by each respective non-coplanar reflective surface of the split mirror.

4. The method of claim 1 wherein directing the light signals towards the optical splitter by the split mirror further includes:
   directing respective discrete sets of light signals towards the optical splitter by each respective non-coplanar reflective surface of the split mirror.

5. The method of claim 1 wherein scanning the light signals towards the split mirror across the scan range by the scanning laser projector further includes:
   scanning at least 90% of the light signals onto the split mirror by the scanning laser projector.

6. The method of claim 1 further including:
   receiving at least 90% of the reflected light signals from the split mirror by the optical splitter.

7. The method of claim 1 wherein the optical splitter includes at least two non-coplanar surfaces, and wherein:
   directing the light signals towards the optical splitter by the split mirror includes directing a first set of light signals towards a first non-coplanar surface of the optical splitter by a first non-coplanar surface of the split mirror and directing a second set of light signals towards a second non-coplanar surface of the optical splitter by a second non-coplanar surface of the split mirror.

8. The method of claim 7 wherein directing the light signals towards the holographic combiner by the optical splitter includes:
   directing the first set of light signals towards the holographic combiner by the first non-coplanar surface of the optical splitter; and
   directing the second set of light signals towards the holographic combiner by the second non-coplanar surface of the optical splitter.

9. The method of claim 8 wherein directing the light signals to at least two exit pupils at or proximate an eye of the user by the holographic combiner includes:
   directing the first set of light signals to a first exit pupil by the holographic combiner; and
   directing the second set of light signals to a second exit pupil by the holographic combiner.

* * * * *